US011079301B2

(12) United States Patent
Rusch et al.

(10) Patent No.: US 11,079,301 B2
(45) Date of Patent: Aug. 3, 2021

(54) DEVICE FOR THE DETECTION AND SIGNALISATION OF A LEAKAGE AND A HEAT EXCHANGER

(71) Applicant: Joulia AG, Biel (CH)

(72) Inventors: Christoph Rusch, Grossaffoltern (CH); Reto Schmid, Gümlingen (CH); Roman Svaton, Biel (CH)

(73) Assignee: JOULIA AG, Biel (CH)

( * ) Notice: Subject to any disclaimer, the term of this patent is extended or adjusted under 35 U.S.C. 154(b) by 355 days.

(21) Appl. No.: 16/301,972

(22) PCT Filed: May 17, 2017

(86) PCT No.: PCT/CH2017/000046
§ 371 (c)(1),
(2) Date: Nov. 15, 2018

(87) PCT Pub. No.: WO2017/197537
PCT Pub. Date: Nov. 23, 2017

(65) Prior Publication Data
US 2019/0162626 A1 May 30, 2019

(30) Foreign Application Priority Data
May 18, 2016 (CH) ..................................... 00641/16

(51) Int. Cl.
*G01M 3/28* (2006.01)
*G01M 3/18* (2006.01)
(52) U.S. Cl.
CPC ............ *G01M 3/283* (2013.01); *G01M 3/183* (2013.01); *G01M 3/187* (2013.01); *G01M 3/188* (2013.01); *G01M 3/2815* (2013.01)

(58) Field of Classification Search
CPC ...... G01M 3/283; G01M 3/183; G01M 3/187; G01M 3/188; G01M 3/2815
See application file for complete search history.

(56) References Cited

U.S. PATENT DOCUMENTS 2,864,404 A 12/1958 Bruegger et al.
4,199,975 A 4/1980 Schrock et al.
(Continued)

FOREIGN PATENT DOCUMENTS

CN 101796290 8/2010
EP 0 365 042 4/1990
WO 2009/093995 7/2009

OTHER PUBLICATIONS

Switzerland Search Report dated Nov. 4, 2016, Application No. 6412016, 3 pages.
(Continued)

*Primary Examiner* — Herbert K Roberts
*Assistant Examiner* — John M Royston
(74) *Attorney, Agent, or Firm* — Rankin, Hill & Clark LLP

(57) ABSTRACT

A device for detecting and signalising a leakage in a double-walled conduit system of a heat exchanger for heating fresh water by way of heat from waste water in the sanitary field as well as a heat exchanger including such a device. The device has an elastic element and a signalisation unit, wherein the elastic element is essentially liquid-tight and the signalisation unit is configured to generate an acoustic signal and the signalisation unit is activatable by way of a mechanical deformation of the elastic element.

15 Claims, 4 Drawing Sheets

(56) References Cited

U.S. PATENT DOCUMENTS

| | | | |
|---|---|---|---|
| 5,022,265 A | 6/1991 | Voss | |
| 5,334,973 A * | 8/1994 | Furr | G01M 3/16 |
| | | | 200/61.05 |
| 6,552,355 B1 * | 4/2003 | Green | G01M 3/38 |
| | | | 250/564 |
| 6,914,531 B1 | 7/2005 | Young | |
| 2013/0145825 A1 * | 6/2013 | Kinnen | F02M 37/0029 |
| | | | 73/40.5 R |

OTHER PUBLICATIONS

English translation of International Preliminary Report on Patentability dated Nov. 20, 2018 (Nov. 20, 2018), Application No. PCT/CH2017/000046, 10 pages.
English translation of Chinese Office Action dated Jun. 11, 2020, Application No. 201780029261.8, 8 pages.

* cited by examiner

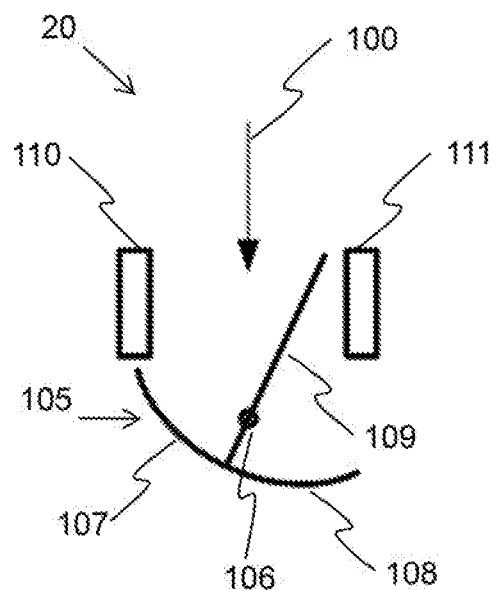
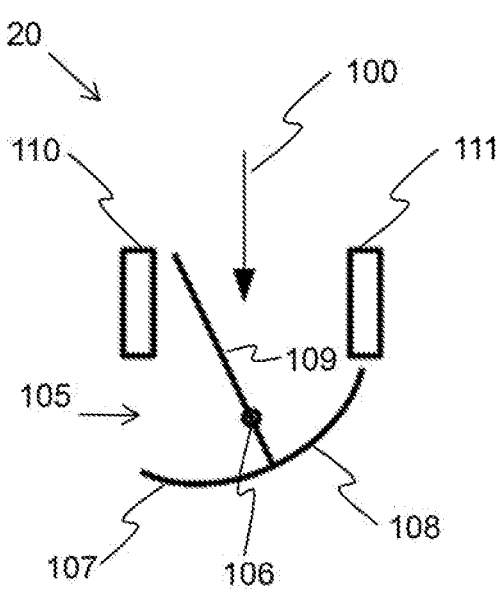
Fig. 5a                     Fig. 5b
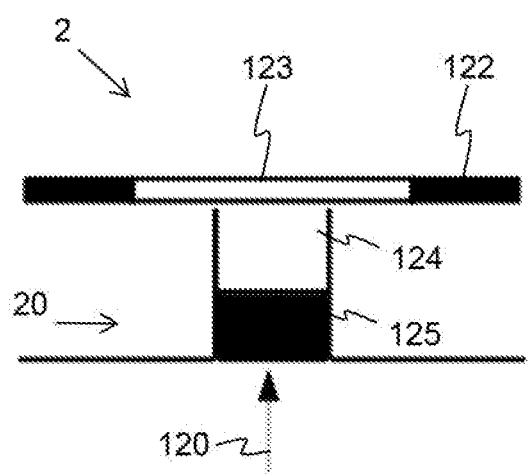
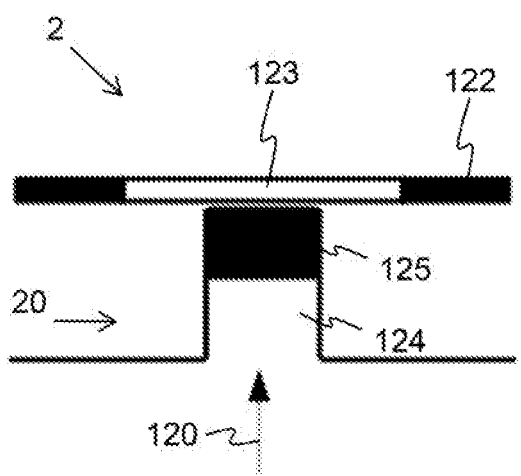
Fig. 6a                     Fig. 6b

DEVICE FOR THE DETECTION AND SIGNALISATION OF A LEAKAGE AND A HEAT EXCHANGER

BACKGROUND OF THE INVENTION

Field of the Invention

The invention relates to the field of detecting and signalising a leakage, in particular in a double-walled conduit system of a heat exchanger, for example in the field of sanitation.

Description of Related Art

Devices for the detection and optical signalisation of a leakage are known from the state of the art. In a simple form, water is led into the base in the case of a leakage, by which means visible water damage occurs, such damage serving as an optical signal.

Various regulations for conduits systems of heat exchangers exist in various countries, so as to reduce the danger of any mixing of fresh water and service water, for example in the case of a leakage. In some countries, the conduit system must be designed in a double-walled manner. In some countries, a leakage must be detectable within a certain period of time and/or under certain conditions.

SUMMARY OF THE INVENTION

It is an object of the invention to provide an improved device for detecting and signalising a leakage, as well as a heat exchanger, which, for example:
  can indicate a leak even shortly after it has arisen, and/or
  can indicate a leak without significant water damage arising and/or
  whose signal can also easily be perceived by an inattentive user, and/or
  can be inexpensively manufactured and/or installed, and/or
  are service-friendly and/or reusable, and/or
  can reliably detect and signalise even a small flow of leakage water.

These objects are achieved by a device for the detection and signalisation of a leakage, as well as a heat exchanger, with the features of the respective patent claims.

The device for the detection and signalisation of a leakage thus includes
  an elastic element
  and a signalisation unit,
wherein
  the elastic element is essentially liquid-tight,
  the signalisation unit is configured to generate an acoustic signal, and
  the signalisation unit is activatable by way of a mechanical deformation of the elastic element.

The device can be configured for the detection and signalisation of penetration of fluid into a cavity. In particular, the device can be configured for the detection and signalisation of a leakage of a double-walled conduit system of a heat exchanger for heating fresh water by way of the heat from waste water, in the sanitary field, for example for shower or a bath tub. The conduit system can be designed as a pipe conduit system.

The elastic element can be designed in an essentially gas-tight manner. The elastic element can bear on a connection piece in an essentially liquid-tight and/or gas tight manner. For example, the elastic element can be arranged such that it is pressed onto other components of the device and/or of a heat exchanger. This pressing can be realised by the elasticity, the residual stress of the elastic element and/or further elements (e.g. a pipe clamp).

In embodiments, the elastic element can be designed as a membrane.

The signalisation unit can be designed as an electronic signalisation unit.

The signalisation unit can include a component for producing an acoustic signal.

The acoustic signal can be activated by way of the mechanical deformation of the elastic element.

In embodiments, the elastic element forms at least a part of the delimitation of a cavity. The mechanical deformation of the elastic element can be caused by way of a leakage fluid that flows into the cavity.

Leakage fluid that flows into the cavity can increase the pressure in the cavity and the mechanical deformation can be caused by way of this pressure increase. The elastic element can be deformable by the leakage fluid itself and/or by way of the displacement of air which is caused by this. The cavity can be connectable to an intermediate space of a double-walled conduit system, so that if the cavity is connected to the intermediate space, leakage fluid and/or displaced air can get out of the intermediate space into the cavity in the case of a leakage.

In embodiments, the device for detecting and signalising a leakage includes an electrical current circuit. A closure of the electrical current circuit, in particular by way of a switch, can be triggerable (activatable) by the mechanical deformation of the elastic element. The signalisation unit can be activatable by way of the closure of the electrical current circuit. The electrical current circuit can be arranged in the signalisation unit.

In embodiments, the device for the detection and signalisation of a leakage includes an element that is sensitive to a magnetic field, and a magnetic element. The device can therefore be designed such that a spatial relative position between the magnetic-field-sensitive element and the magnetic element is changeable by way of the mechanical deformation of the elastic element and the signalisation unit is activatable by way of the change of the spatial relative position. The magnetic element can be a permanent magnet.

In embodiments, the magnetic-field-sensitive element is designed as a magnetically actuatable switch. A closure of the electrical current circuit can be triggerable (activatable) by the mechanical deformation of the elastic element. The magnetically actuatable switch can be designed as a reed contact.

In embodiments, the switch can be mechanically actuatable for closing the electrical current circuit. For example, a contact that is mechanically connected to the elastic element can be pressed against another contact by way of the mechanical deformation of the elastic element, by which means an electrical current circuit is closed.

In embodiments, the signalisation unit includes an integrated circuit (by abbreviation, also called IC). The integrated circuit can be programmable.

In embodiments, the acoustic signal of the signalisation unit can be electronically generated. The device for the detection and signalisation of a leakage can include a battery for the supply of the signalisation unit with electrical energy.

In embodiments, the signalisation unit can be configured to produce an acoustic signal with a varying frequency. A varying frequency has the advantage that it can be more easily perceived by a user.

In embodiments, the signalisation unit is configured to generate an acoustic signal with interruptions (or pauses), in particular with interruptions which become longer with time. Interruptions can reduce the energy consumption for generating the acoustic signal. The duration of the supply of the signalisation unit with electrical energy from a battery can be extended by way of this. Given the same capacity of the battery, the acoustic signal can be emitted again and again over a longer period of time on account of this. This is advantageous, for example, if the user is on holiday whilst the leakage arose.

The heat exchanger with a double-walled conduit system for heating fresh water by way of heat from waste water in the sanitary field includes a previously described device for the detection and signalisation of a leakage. In particular, the heat exchanger can be designed for use in a shower or bath tub. The double-walled conduit system can be designed as a double-walled pipe conduit system.

In embodiments, the heat exchanger includes a cavity,
  wherein the elastic element forms at least a part of the delimitation of the cavity,
  wherein, in the case of a leakage in the double-walled conduit system, leakage fluid and/or displaced air can be led into the cavity, and
  wherein the mechanical deformation of the elastic element can be created by leakage fluid and/or displaced air, which flow into the cavity In embodiments, an electrical current circuit is closed if the overpressure in the cavity exceeds 10 mbar, in particular 20 mbar or 50 mbar. In this context, the overpressure means a pressure above atmospheric pressure.

In embodiments, the distance between an idle position and a switching position of the magnetic element is at least 2 mm, in particular at least 3 mm or at least 3.5 mm or at least 5 mm.

In embodiments, the elastic element is configured to act as a relief valve. The elastic element can be configured as a relief valve on account of its design and/or its arrangement. For example, an edge region of the elastic element can be pressed onto other components up to a certain overpressure and be configured such that—from exceeding a certain overpressure in the cavity—the edge region of the elastic element detaches itself at least partly from the component. The cavity is opened by way of this, and the liquid and/or gas (expressed more generally: pressure) can escape out of the cavity.

In embodiments, the elastic element is configured to bleed or discharge liquid and/or gas out of the cavity from an overpressure in the cavity of at least 100 mbar, in particular from an overpressure of at least 120 mbar or of at least 150 mbar.

In embodiments, the signalisation unit includes components that are configured to inhibit the mechanical deformation, which is necessary for the activation of the signalisation unit, in particular in normal operation. In this context, normal operation means operation without any leakage. For example, the signalisation unit can include two components that are designed as webs and that are configured to space the elastic element from certain components of the signalisation unit (for example, from a switch) if no fluid is located in the cavity.

In embodiments, the signalisation unit is held in the operating position by way of the resiliency force of the elastic element. For example, the signalisation unit can be pressed against parts of the heat exchanger by the elastic element and, by way of this, be positioned in a stable manner. The elastic element and/or the heat exchanger can include positioning elements for the stable positioning, the positioning elements being configured to inhibit a slipping of the signalisation unit.

In embodiments, the heat exchanger includes an optical signalisation unit.
  The optical signalisation unit can be part of the signalisation unit for generating an acoustic signal or be a component which is separate from this.
  The optical signal of the optical signalisation unit can complement the acoustic signal.
  The optical signal can be reset.
  The optical signal can be arranged such that it is only visible from outside the heat exchanger if parts of the heat exchanger have been displaced in comparison to normal operation and/or have been disassembled.
  The optical signal—in particular in an activated state—can be arranged in/on a viewing window of a component of the heat exchanger.

In embodiments, the optical signalisation unit is configured to generate a bi-stable optical signal, wherein the bi-stable optical signal is activatable by way of the mechanical deformation of the elastic element. A bi-stable optical signal is an optical signal that is either situated in an activated state or in a non-activated state, wherein the change from the one state into the other state necessitates an influence, for example a force action.

In embodiments, the bi-stable optical signal is activatable by a mechanical deformation of a display element (for example, a component that can be everted and/or displaced). The display element can be part of an elastic element which bears on a connection piece.

In embodiments, the heat exchanger is configured such that the acoustic signal of the signalisation unit is activatable by way of a force action upon
  the device and/or
  a part of the device and/or
  another part of the heat exchanger.

In particular, the heat exchanger can be configured for carrying out a manually triggerable self-test of the device. The functional capability of the device and/or the charged state of a battery can be tested by way of this, without having to create an artificial leakage. For example, the heat exchanger is configured such that the signalisation unit (for example with the help of a screwdriver) can be pressed against the elastic element and the signalisation unit is activatable due to this. In another example, the heat exchanger is configured such that the signalisation unit is activatable by way of a pressing against an elastic part of the outer envelope of the cavity, wherein the pressure force is transmitted via the air pressure in the cavity and thus causes the mechanical deformation of the elastic element.

A second aspect of the invention relates to a device for the detection and signalisation of a leakage, comprising
  a guide for guiding leakage fluid
  and a signalisation unit,
wherein
  the signalisation unit is configured to generate an acoustic signal and
  wherein the guide for guiding leakage fluid is configured such that the signalisation unit is activatable and/or operable by way of a pressure force, a weight force and/or a kinetic energy, of the guided leakage fluid.

The signalisation unit can be designed as a mechanical signalisation unit.

In embodiments of the second aspect, the guide includes a valve, in particular a relief valve, for example a so-called duck bill valve. The application of a valve can ensure that the leakage fluid—at least at some locations of the device—flows and/or is incident with a certain minimum pressure.

In embodiments of the second aspect, a double-walled conduit system is configured—in the case of a leakage—to lead leakage fluid firstly through an intermediate space between the two walls and from there into a cavity. A mechanical signalisation unit can be arranged in the cavity, the signalisation unit being activatable and/or operable by the pressure force and/or the weight force, of the leakage fluid which is guided into the cavity.

In embodiments of the second aspect, a mechanical signalisation unit is designed as a rotatable drum, in whose inside balls are located or lie. The drum can be brought into rotation by the leakage fluid, for example by way of vanes that are arranged on the drum surface or on the rotation pivot, by which means the balls, which are mounted in the inside, hit the drum wall or hit one another and thus generate an acoustic signal.

In embodiments of the second aspect, balls or other objects are mounted in a housing, wherein leakage fluid, which is guided into the housing, can mechanically excite the balls or the other objects and an acoustic signal is generated by way of the mechanical excitation, for example due to the impact of the balls or other objects against the housing wall or against one another.

In embodiments of the second aspect, a mechanical signalisation unit is designed as a turbine wheel that can be driven by leakage fluid and that is configured to generate acoustic signal. The turbine wheel can drive an eccentric and/or a generator. The generator can be configured to feed an electrical signalisation unit or an accumulator/battery of an electrical signalisation unit.

In embodiments of the second aspect, a mechanical signalisation unit is designed as a so-called "hydrohammer". Herein, a component, which is anchor-like seen in cross section—also called "anchor"—is pivotably mounted and is designed such that it can assume essentially two configurations. Concerning the first configuration, the anchor is pivoted on the pivoting mounting such that the guided leakage fluid is primarily guided into or onto a first fluke. Concerning a second configuration, the anchor is pivoted on the pivoting mounting such that the guided leakage fluid is primarily guided into or onto a second fluke. An exchange between the two configurations is realised by way of a pivoting of the anchor along the pivoting mounting. The guiding of the fluid into the respective fluke can be supported by a shank, which lies essentially perpendicularly to the anchor flukes. The hydrohammer is designed such that in the case of a leakage, the guided leakage fluid is firstly guided primarily into or onto the first fluke. The anchor pivots on the pivoting mounting over into the second configuration due to the pressure force and/or weight force of the leakage fluid, so that the leakage fluid is now guided onto the second fluke. The hydrohammer can therefore be designed and/or arranged such that the anchor is repeatedly pivoted to and fro by continuously flowing-in leakage fluid. The hydrohammer can be configured such that on pivoting, parts of the anchor or parts, which are connected to the anchor strike other components, for example sound-emitting bodies and generate an acoustic signal on account of this. These other components can further serve for limiting the pivoting of the anchor and/or contribute to the realisation of both configurations.

BRIEF DESCRIPTION OF THE DRAWINGS

The subject-matter of the invention is hereinafter explained in more detail by way of preferred embodiment examples which are represented in the accompanying drawings. In each case in a schematic manner are shown in:

FIG. 5a, 5b a signalisation unit in the form of a hydrohammer.

FIG. 6a, 6b an optical signalisation unit with a displaceable component.

DETAILED DESCRIPTION OF THE INVENTION

Figure 1:
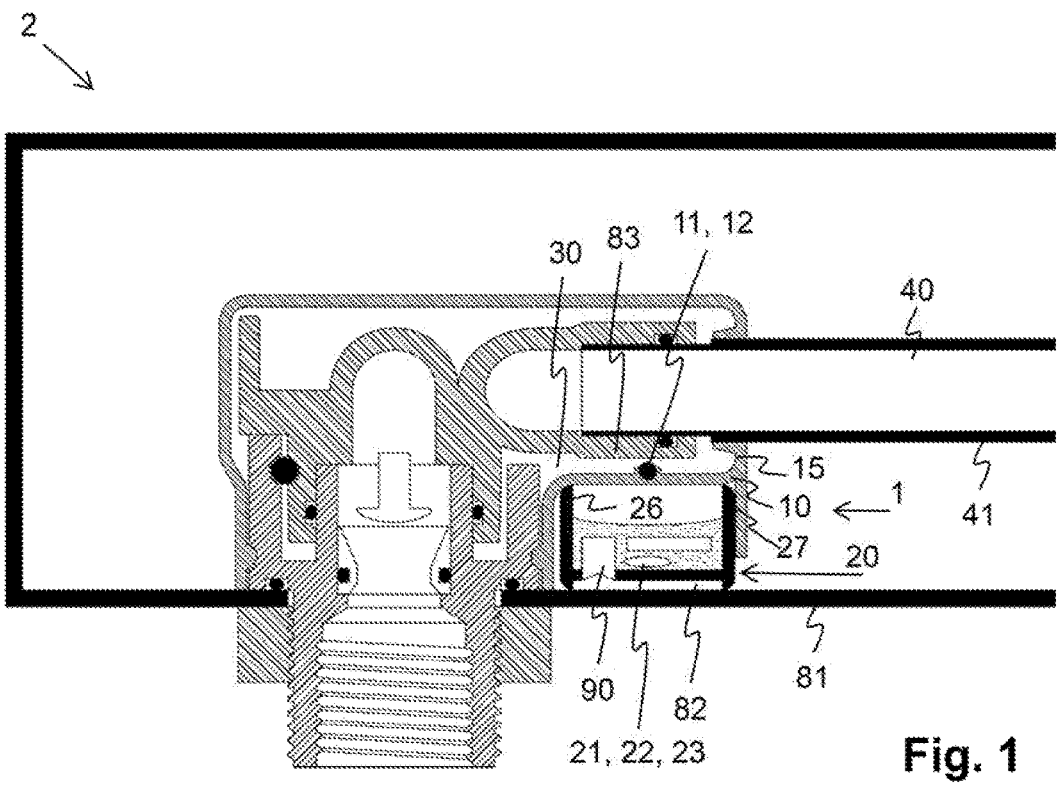
FIG. 1 a heat exchanger with a double-walled pipe conduit system and with a device for the detection and signalisation of a leakage with a magnetic element in an idle position.

FIG. 1 shows a detail of a heat exchanger 2 for heating fresh water by way of heat from waste water, in the sanitary field, for example for a shower or a bath tub. The heat exchanger 2 includes a device 1 for the detection and signalisation of a leakage, the device including an elastic element 10 and a signalisation unit 20. The signalisation unit 20 includes a component 90 for the electronic generation of an acoustic signal.

The heat exchanger 2 further includes a cavity 30 that is adjacent to a double-walled conduit system 40 and that is partly delimited by the elastic element 10. The elastic element 10 is designed in an essentially liquid-tight manner and can consist, for example, of rubber or another elastic plastic. The elastic element 10 includes a magnetic element 11 (which is to say it is connected to a magnetic element 11), which can be designed as a permanent magnet 12.

The signalisation unit 20 is pressed by the elastic element 10 onto a wall 81 of the heat exchanger 2 and is positioned by way of this. The signalisation unit 20 includes a magnetically actuatable switch 22, which can close an electrical current circuit 24. The magnetically actuatable switch 22 can include a magnet-sensitive or magnetically sensitive element 21 and be designed as a so-called reed contact 23. The signalisation unit 20 in the direction of the magnetic element 11 includes components 26, 27 that are designed as webs and which, in normal operation, hold the elastic element 10—and by way of this in particular the magnetic element 11—at a distance to the magnetically actuatable switch 22. In the idle position (thus in normal operation) the distance between the magnetic element 11 and the magnetically actuatable switch 22 is, for example, 6 mm.

Figure 2:
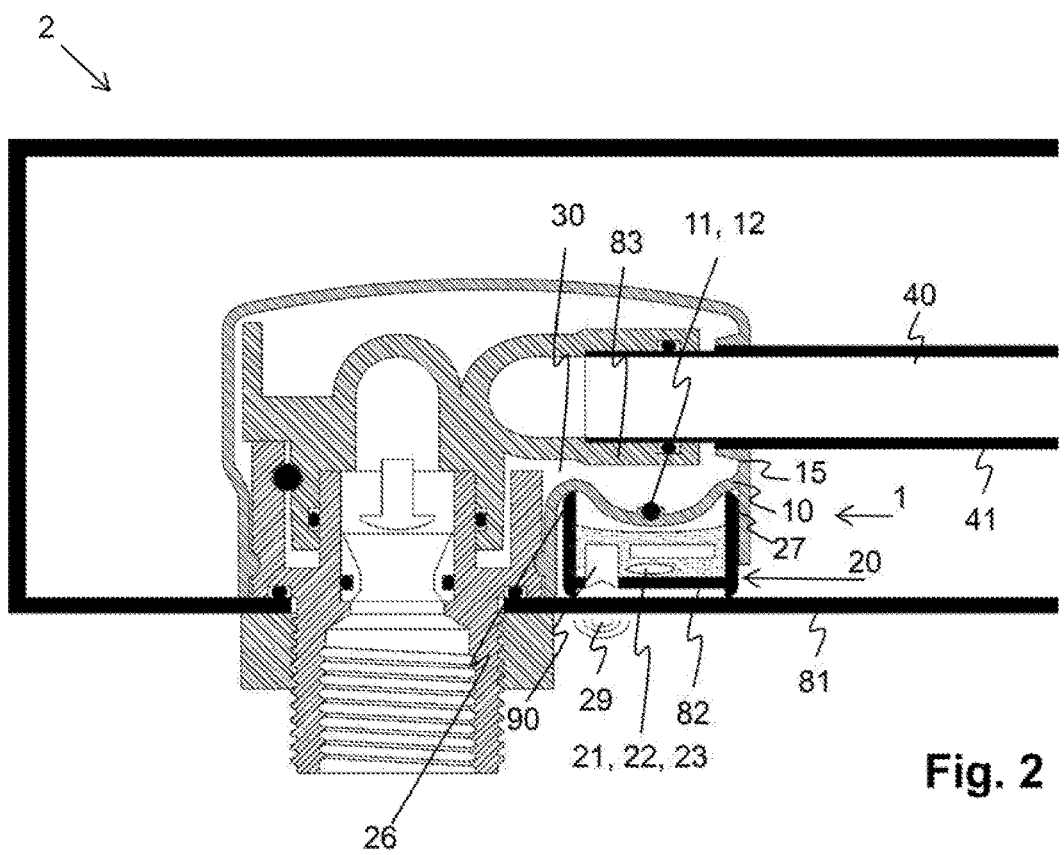
FIG. 2 the heat exchanger of FIG. 1 with the magnetic element in a switching position, FIG. 3 an electric current circuit with an electrical signalisation unit and with a magnetically actuatable switch.

FIG. 2 shows the detail of a heat exchanger 2 from FIG. 1 in the case of a leakage in a wall of the conduit system 40. Leakage fluid and/or displaced air is led into the cavity 30 via an intermediate space 41 between the two walls of the conduit system 40, by which means an overpressure arises in the cavity 30.

The elastic element 10 was mechanically deformed due to the overpressure in the cavity 30, and the magnetic element 11 pressed past the distanced components 26, 27 of the signalisation unit 20—in the direction of the magnetically actuatable switch 22.

As soon as the distance between the magnetic element 11 and the magnetically actuatable switch 22 falls short of a threshold value, the magnetically actuatable switch 22 closes an electrical current circuit 24, by which means the signalisation unit 20 is activated and an acoustic signal 29 produced. In practise, the threshold of the distance can be e.g. 3 mm and can be reached given an overpressure in the cavity 30 of e.g. 20 mbar.

As soon as the pressure in the cavity 30 reduces, for example due to the leakage having been dealt with or the water having been turned off, the mechanical deformation of the elastic element 10 also reduces. The magnetic element 11 spaces itself from the magnetically actuatable switch 22 on account of this and, from a certain distance, the electrical current circuit 24 is interrupted anew, by which means the signalisation unit 20 is deactivated and the acoustic signal 29 ends. The detail of the heat exchanger 2 is now again in the state that is shown in FIG. 1 and the device 1 is again ready for detecting and signalising a leak.

In edge regions 15, the elastic element 10 is pressed onto other components of the heat exchanger 2 due to its residual stress. Up to a certain overpressure, the elastic element 10 sufficiently seals the cavity 10 at the edge regions 15, so that liquid and/or gas cannot essentially escape from the cavity 30. As is described above, the signalisation unit 20 is activated from a first overpressure. If the leak is not dealt with, the pressure in the cavity 30 possibly increases further with time. In this situation, the elastic element 10 acts as a relief valve: from a second overpressure that, in practise, can lie, e.g., at 120 mbar, the elastic element 10 is subjected to such high forces that it detaches itself from the other components of the heat exchanger 2, e.g. the conduit system 40, at one of the edge regions 15. The overpressure can be relieved from the cavity 30 by way of this. Damage to the elastic element 10 is prevented by way of this.

The shown signalisation unit 20 is designed such that a gap 82 remains between the signalisation unit 20 and the wall 81 when it is pressed onto the wall 81 of the heat exchanger 2 by the elastic element 10. The tip of a screwdriver for example can be inserted into this gap and a force can be exerted against the signalisation unit 20 via the tip of the screwdriver. The resulting displacement of the signalisation unit 20 is transmitted via the webs 26, 27 onto the elastic element 10, by which means this element is displaced together with the signalisation unit 20. Bulgings 83 on a part of the interior of the cavity 30 prevent the magnetic element 11, which is fastened to the elastic element 10, from co-moving with the elastic element 10. Given an increasing exertion of force, the distance between the magnetic element 11 and the magnetically actuatable switch 22 reduces. The signalisation unit 20 activates given a sufficiently small distance. A user can therefore test the functionality of the device 1 or of the signalisation unit 20 in a simple manner.

Figure 3:
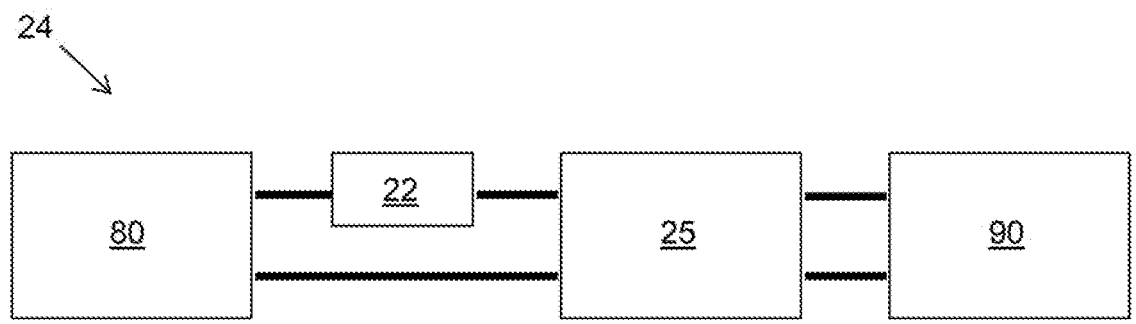

FIG. 3 shows an electric current circuit 24 with a switch 22. The current circuit 24 can be arranged for example in a signalisation unit 20 of the device 1. Given a closed switch 22, an energy source 80—designed for example as a battery—is connected to the component 90 for the electronic generation of an acoustic signal, by which means this generates an acoustic signal 29. The electric current circuit 24 is interrupted if the switch 22 is not closed, and no acoustic signal 29 is generated. The switch 22 can be magnetically and/or mechanically activatable.

Optionally, the electric current circuit 24 includes an integrated circuit 25 (abbreviated, also called "IC"), which can be programmable. The integrated circuit 25 can be configured such that the component 90 for the electronic generation of an acoustic signal produces an acoustic signal 29 with a varying frequency and/or with interruptions (or pauses), given a closed switch 22.

Figure 4:
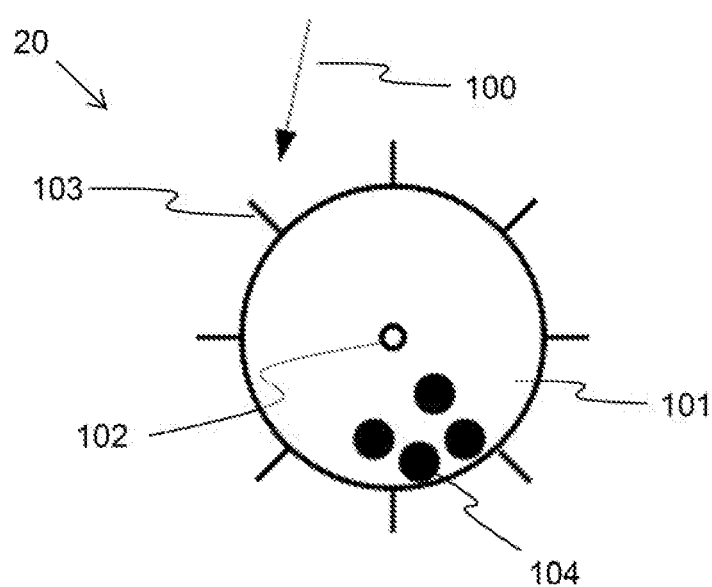
FIG. 4 a signalisation unit in the form of a rotatable drum.

FIG. 4 shows a signalisation unit 20 according to a second aspect of the invention. The signalisation unit 20 is designed as a rotatable drum 101. The drum 101 is rotatably mounted about a rotation axis 102. Balls 104 are mounted in the inside of the drum 101. Vanes (wings) 103 are arranged on the surface of the drum 101. The arrow 100 indicates the direction of the guided leakage fluid in the case of a leakage. The leakage fluid is guided such that it hits the vanes 103 and by way of this brings the drum 101 into rotation—similarly to a waterwheel. The balls 103, which are mounted in the inside of the drum 101, strike one another and/or against the inner wall of the drum 101 on account of this rotation, by which means an acoustic signal is generated.

FIG. 5*a* shows a signalisation unit 20 according to the second aspect of the invention. The signalisation unit 20 is designed as a so-called "hydrohammer". An anchor 105 with a shank and two flukes 107, 108 is pivotably mounted on a pivoting mounting 106. The arrow 100 indicates the direction of the guided fluid in the case of a leak. In the case of a leakage, the leakage fluid is primarily guided into a first fluke 107 due to the arrangement of the shank 109. The anchor 105 pivots over on its pivot mounting 106 due to the pressure force and/or the weight force of the leakage fluid. FIG. 5*b* shows the anchor 105 after the pivoting-over. The shank 109 is now arranged such that the leakage fluid is primarily guided into a second fluke 108. Given a continuous action of the leakage fluid, the anchor 105 is repeatedly pivoted to and fro. On pivoting, parts of the anchor—for example the flukes 107, 108 and/or the shank 109—or parts which are connected to the anchor strike against other components 110, 111, by which means an acoustic signal is generated. The components 110, 111 can be designed for example as sound-emitting bodies and/or be configured for limiting the pivotability of the anchor 105.

FIG. 6*a* shows a detail of a heat exchanger 2 with a signalisation unit 20 for the optical signalisation. A signalisation unit 20 for the optical signalisation can replace and/or compliment a signalisation unit 20 for acoustic signalisation. The signalisation unit 20 includes a display element, which is designed as a displaceable component 125. The displaceable component 125 is arranged in a shaft 124 which is arranged on a viewing window 123 in a frame 122 of the heat exchanger 2. The viewing window 123 can be arranged at one end of the shaft 124 (as is shown in the figure) or at another position (for example at one side of the shaft 124). The arrow 120 shows the force action of the leakage fluid in the case of a leakage. FIG. 6*b* shows the signalisation unit 20 in the case of a leakage. The displaceable component 125 is displaced along the shaft by way of the force action of the leakage fluid. The displaceable component 125 can include a conspicuous signal colour, so that it can be easily perceived through the viewing window 123.

The force effect can be transmitted in a direct manner by the leakage fluid itself or indirectly, for example by way of the elastic element 10 or by way of a component 121 that can be everted (both are not shown in FIGS. 6*a* and 6*b*).

Optionally, the displaceable component 125 and the shaft 124 can be designed such that the displaceable component 125 is frictionally mounted on at least a few walls of the inside of the shaft 124, at least in the part of the shaft 125, which is situated on the viewing window 123. In such a case, a certain pressure is necessary in order to displace the displaceable component 125 along the shaft 124. Inherently with this, a certain pressure is necessary, in order to displace the displaceable component 125 back along the shaft 124 again. This optical signalisation unit 20 can serve as a semi-permanent display by way of this. In other words, this optical signalisation unit 20 can indicate that a leakage has occurred, even after a pressure drop. Such an embodiment is an example of an optical signalisation unit 20 with a bi-stable optical signal. At the same time, the displaceable component 125 can be pushed back again, for example manually, in order for it is be set up one again for the detection and the optical signalisation of a leakage.

Figure 7A:
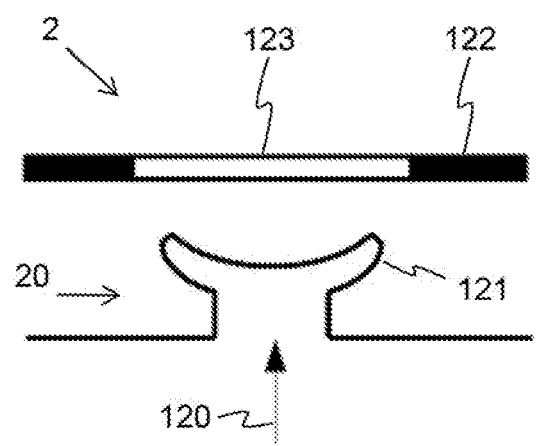
FIG. 7a, 7b an optical signalisation unit with a component which can be everted.
Figure 7B:
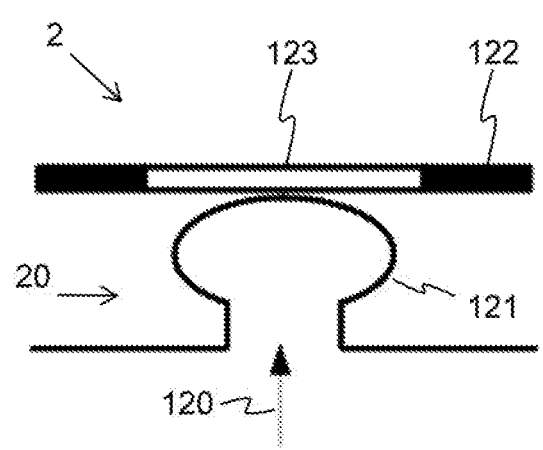

FIG. 7a shows a detail of a heat exchanger 2 with a signalisation unit 20 for the optical signalisation. The signalisation unit 20 includes a display element which is designed as a component 121 which can be everted. The evertable component 121 in the shown example is arranged on a viewing window 23 in a frame 122 of the heat exchanger 2. The arrow 120 shows the force action of the leakage fluid in the case of a leakage. FIG. 7b shows the signalisation unit 20 in the case of a leak. The evertable component 121 is everted by way of the force action of the leakage fluid. The evertable component 121 can have a conspicuous signal colour, so that it can be easily perceived through the viewing window 123. This embodiment is an example of an optical signalisation unit 20 with a bi-stable optical signal.

The invention claimed is:

1. A device for detecting and signalising a leakage in a double-walled conduit system of a heat exchanger for heating fresh water by way of heat from waste water in a sanitary field, the device comprising:
   an elastic element, and
   a signalisation unit,
wherein:
   the elastic element is essentially liquid-tight,
   the signalisation unit is configured to generate an acoustic signal,
   the signalisation unit is activatable by way of a mechanical deformation of the elastic element, and
   the elastic element is a membrane.

2. The device according to claim 1, wherein the elastic element forms a part of the delimitation of a cavity and the mechanical deformation of the elastic element is generatable by leakage fluid which flows into the cavity, and wherein the cavity is connectable to an intermediate space of a double-walled conduit system.

3. The device according to claim 1, comprising:
   an element that is sensitive to a magnetic field, and
   a magnetic element,
wherein a spatial relative position between the magnetic-field-sensitive element and the magnetic element is changeable by way of the mechanical deformation of the elastic element, and the signalisation unit is activatable by way of the change of the spatial relative position.

4. The device according to claim 3, wherein the magnetic-field-sensitive element is a magnetically actuatable switch, and a closure of an electrical current circuit is triggerable by way of the mechanical deformation of the elastic element.

5. The device according to claim 1, wherein the signalisation unit comprises an integrated circuit.

6. The device according to claim 1, wherein the signalisation unit is configured to generate an acoustic signal with a varying frequency and/or with interruptions.

7. A heat exchanger with a double-walled conduit system for heating fresh water by way of heat from waste water in a sanitary field, the heat exchanger including a device for detecting and signalising a leakage in the double-walled conduit system, the device comprising:
   an elastic element, and
   a signalisation unit,
wherein:
   the elastic element is essentially liquid-tight,
   the signalisation unit is configured to generate an acoustic signal,
   the signalisation unit is activatable by way of a mechanical deformation of the elastic element, and
   the device is incorporated into a shower or bath tub.

8. The heat exchanger according to claim 7, comprising a cavity, wherein:
   the elastic element forms a part of the delimitation of the cavity,
   in the case of a leakage in the double-walled conduit system, leakage fluid and/or displaced air can be led into the cavity, and
   the mechanical deformation of the elastic element can be created by leakage fluid and/or displaced air, which flow into the cavity.

9. The heat exchanger according to claim 7, wherein an electrical current circuit is closed if the overpressure in the cavity exceeds 20 mbar.

10. The heat exchanger according to claim 7, wherein the device comprises:
    an element that is sensitive to a magnetic field, and
    a magnetic element,
    wherein a spatial relative position between the magnetic-field-sensitive element and the magnetic element is changeable by way of the mechanical deformation of the elastic element, and the signalisation unit is activatable by way of the change of the spatial relative position, and
    wherein the distance between an idle position and a switching position of the magnetic element is at least 2 mm.

11. The heat exchanger according to claim 7, wherein the elastic element is configured to act as a relief valve.

12. The heat exchanger according to claim 7, wherein the signalisation unit comprises components that are configured to inhibit the mechanical deformation which is necessary for the activation of the signalisation unit.

13. The heat exchanger according to claim 7, wherein the signalisation unit is held in the operating position by way of a resiliency force of the elastic element.

14. The heat exchanger according to claim 7, comprising an optical signalisation unit.

15. The heat exchanger according to claim 7, wherein the heat exchanger is configured such that the acoustic signal of the signalisation unit is activatable by way of a force action upon:
    the device, and/or
    a part of the device, and/or
    another part of the heat exchanger.

* * * * *